US 9,220,038 B2

(12) United States Patent
Martin et al.

(10) Patent No.: US 9,220,038 B2
(45) Date of Patent: Dec. 22, 2015

(54) METHOD AND APPARATUS FOR EVALUATING AN INTER-FREQUENCY MEASUREMENT EVENT UTILIZING A DETECTED CELL

(75) Inventors: Brian Martin, Surrey (GB); Keiichi Kubota, Surrey (GB); Mitsuya Saito, Surrey (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/876,268

(22) PCT Filed: Sep. 28, 2011

(86) PCT No.: PCT/FI2011/050837
§ 371 (c)(1),
(2), (4) Date: Mar. 27, 2013

(87) PCT Pub. No.: WO2012/042112
PCT Pub. Date: Apr. 5, 2012

(65) Prior Publication Data
US 2013/0189972 A1  Jul. 25, 2013

Related U.S. Application Data

(60) Provisional application No. 61/388,913, filed on Oct. 1, 2010.

(51) Int. Cl.
*H04B 7/00* (2006.01)
*H04W 36/00* (2009.01)

(52) U.S. Cl.
CPC ...... *H04W 36/0083* (2013.01); *H04W 36/0088* (2013.01); *H04W 36/0094* (2013.01)

(58) Field of Classification Search
CPC .................... H04W 36/0083; H04W 36/0094; H04W 36/0061

USPC ................ 455/434, 525, 432.1–432.3, 435.2, 455/436–444, 500, 517, 422.1, 403, 445, 455/509, 450, 426.1, 426.2, 412.1, 412.2, 455/410, 411, 67.11, 423–425; 370/310, 370/331, 328, 329, 332, 338, 343
See application file for complete search history.

(56) References Cited

U.S. PATENT DOCUMENTS 5,915,221 A * 6/1999 Sawyer et al. ................ 455/437
6,445,917 B1   9/2002 Bark et al.
(Continued)

FOREIGN PATENT DOCUMENTS

CN     1399855 A        2/2003
WO     WO 01/20942 A1   3/2001

OTHER PUBLICATIONS

International Search Report received for corresponding Patent Cooperation Treaty Application No. PCT/FI2011/050837, dated Jan. 10, 2012, 3 pages.
(Continued)

*Primary Examiner* — Keith Ferguson
(74) *Attorney, Agent, or Firm* — Alston & Bird LLP

(57) ABSTRACT

A method, apparatus and computer program product are provided to determine if a measurement event is satisfied by one or more detected cells and to correspondingly advise the network to facilitate consideration of whether a handover or cell reselection procedure is desired. The network may, in turn, determine whether the detected cell(s) that satisfied the measurement event are appropriate to be considered in conjunction with a handover or cell reselection procedure, such as by being in the same public land mobile network (PLMN) as opposed to being in a different PLMN and/or cells that are barred or reserved for operator use. Thus, the network may take advantage of opportunities for handover or cell reselection offered by a detected cell, while still insuring that handover or cell reselection procedures remain limited to cells that are appropriate.

15 Claims, 6 Drawing Sheets

(56) References Cited

U.S. PATENT DOCUMENTS

| | | | |
|---|---|---|---|
| 6,845,238 B1 | 1/2005 | Mueller | |
| 6,917,809 B2* | 7/2005 | Horwath et al. | 455/436 |
| 7,136,647 B2 | 11/2006 | Huang et al. | |
| 2004/0032845 A1 | 2/2004 | Chen | |
| 2006/0121907 A1* | 6/2006 | Mori et al. | 455/447 |
| 2007/0207822 A1* | 9/2007 | Andersson et al. | 455/502 |
| 2008/0002628 A1* | 1/2008 | Bi et al. | 370/335 |
| 2009/0069012 A1* | 3/2009 | Tu | 455/436 |
| 2009/0176490 A1* | 7/2009 | Kazmi et al. | 455/434 |
| 2010/0113035 A1 | 5/2010 | Eskicioglu et al. | |
| 2010/0177758 A1* | 7/2010 | Aqvist et al. | 370/342 |
| 2010/0323631 A1 | 12/2010 | Martin et al. | |
| 2011/0244858 A1* | 10/2011 | Callender | 455/436 |

OTHER PUBLICATIONS

International Preliminary Report on Patentability for Application No. PCT/FI2011/050837 dated Apr. 11, 2013.

Written Opinion for Application No. PCT/FI2011/050837 dated Jan. 10, 2012.

*Radio Resource Control (RRC): Protocol Specification (Release 10)*, 3GPP TS 25.331 v. 10.0.0 (Jun. 2010), 1792 pages.

Office Action for Chinese Application No. 201180047733.5 dated Apr. 28, 2015.

* cited by examiner

METHOD AND APPARATUS FOR EVALUATING AN INTER-FREQUENCY MEASUREMENT EVENT UTILIZING A DETECTED CELL

RELATED APPLICATION

This application was originally filed as PCT Application No. PCT/FI2011/050837 filed Sep. 28, 2011.

TECHNICAL FIELD

Example embodiments of the present invention generally relate to cellular networks and, more particularly, relate to evaluating inter-frequency measurement events utilizing one or more detected cells that are outside of a neighbor cell list.

BACKGROUND

During network configuration or other network planning exercises, a neighbor cell list may be defined that identifies a plurality of cells that may be capable of supporting communications between a user equipment (UE) and the network. The cells included within the neighbor list may include cells that operate at the frequency that is currently used by the UE, as well as cells that operate at a different frequency that is not currently used by the UE, but that may also support communications between the UE and the network. A neighbor cell list may identify cells in various manners including, for example, by scrambling codes associated with the cells such as in a Code Division Multiple Access (CDMA) based network or by information regarding frequency in use by the cells in a Time Division Multiple Access (TDMA) based network. The neighbor cell list may be utilized, for example, to perform handover of a cell to another cell, or perform cell reselection from one serving/camped cell to another serving/camped cell.

In this regard, the UE may monitor the performance, such as the signal strength, of a first cell that is supporting communications between the UE and the network as well as a number of other cells. Based upon the relative performance of the cells as well as a number of other factors, the UE may be handed over or undergo a cell reselection process from the first cell to another cell included within the neighbor list such that the other cell then begins to support communications between the UE and the network. For example, the UE may be handed over from the first cell to the other cell in instances in which the performance of the other cell exceeds that of the first cell. In instances in which the other cell operates at a different frequency than the first cell, the hand over may result in the communications between the UE and the network not only being supported by a different cell, but also being conducted at a different frequency.

As currently defined by the $3^{rd}$ Generation Partnership Project (3GPP), however, handover and cell reselection procedures are limited to cells in the neighbor cell list even though the UE may detect one or more cells (referred to as "detected cells") that are not on the list. By limiting the handover and cell reselection procedures to cells in the neighbor cell list, the network is able to insure that the handover and cell reselection procedures only involve cells that have been determined by the network to be appropriate, such as cells in the same public land mobile network (PLMN), and cells that are inappropriate, such as cells in a different PLMN and/or cells that are barred or reserved for operator use.

BRIEF SUMMARY

A method, apparatus and computer program product are therefore provided in accordance with an example embodiment to determine if a measurement event is satisfied by one or more detected cells and to correspondingly advise the network to facilitate consideration of whether a handover or cell reselection procedure is desired. In this regard, the network may determine whether the detected cell(s) that satisfied the measurement event are appropriate to be considered in conjunction with a handover or cell reselection procedure, such as by being in the same PLMN as opposed to being in a different PLMN and/or cells that are barred or reserved for operator use. Thus, the network of one example embodiment may take advantage of opportunities for handover or cell reselection offered by a detected cell, while still insuring that handover or cell reselection procedures remain limited to cells that are appropriate.

In one example embodiment, a method is provided that separately evaluates a measurement event utilizing: (i) a virtual active set including one or more cells from a neighbor cell list and (ii) a secondary virtual active set including one or more detected cells that are not included on the neighbor cell list. The method of this example embodiment also causes a report to be provided in an instance in which the measurement event is satisfied with the report including an indication to be provided in an instance in which the measurement event is satisfied by the secondary virtual active set. In one embodiment, the report may also include an indication of the one or more detected cells in the secondary virtual active set that caused the measurement event to be satisfied to be provided.

Prior to the separate evaluation, the method of one embodiment may also maintain both the virtual active set and the secondary virtual active set. The method may also receive an indication that the measurement event is to be separately evaluated with a virtual active set and a secondary virtual active set. Further, the method of one embodiment may cause first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set. The first and second reports may be provided either in parallel or serially.

In another embodiment, an apparatus is provided which includes at least one processor and at least one memory storing computer program code. The at least one memory and the stored computer program code are configured, with the at least one processor, to cause the apparatus to at least separately evaluate a measurement event utilizing: (i) a virtual active set including one or more cells from a neighbor cell list and (ii) a secondary virtual active set including one or more detected cells that are not included on the neighbor cell list. The at least one memory and the stored computer program code may also be configured, with the at least one processor, to cause the apparatus to cause a report to be provided in an instance in which the measurement event is satisfied with the report including an indication to be provided in an instance in which the measurement event is satisfied by the secondary virtual active set. In one embodiment, the report may also include an indication of the one or more detected cells in the secondary virtual active set that caused the measurement event to be satisfied to be provided.

Prior to the separate evaluation, the at least one memory and the stored computer program code may also be configured, with the at least one processor, to cause the apparatus to maintain both the virtual active set and the secondary virtual active set. The at least one memory and the stored computer program code may also be configured, with the at least one processor, to cause the apparatus to receive an indication that the measurement event is to be separately evaluated with a virtual active set and a secondary virtual active set. Further, the at least one memory and the stored computer program code may also be configured, with the at least one processor, to cause the apparatus of one embodiment to cause first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set. The first and second reports may be provided either in parallel or serially.

In another embodiment, a computer program product is provided that includes at least one computer-readable storage medium having computer-readable program instructions stored therein. The computer-readable program instructions include program instructions configured to separately evaluate a measurement event utilizing: (i) a virtual active set including one or more cells from a neighbor cell list and (ii) a secondary virtual active set including one or more detected cells that are not included on the neighbor cell list. The computer-readable program instructions of this example embodiment also include program instructions configured to cause a report to be provided in an instance in which the measurement event is satisfied with the report including an indication to be provided in an instance in which the measurement event is satisfied by the secondary virtual active set. In one embodiment, the report may also include an indication of the one or more detected cells in the secondary virtual active set that caused the measurement event to be satisfied to be provided.

Prior to the separate evaluation, the computer-readable program instructions include program instructions of one embodiment may be configured to maintain both the virtual active set and the secondary virtual active set. The computer-readable program instructions may also include program instructions that are configured to receive an indication that the measurement event is to be separately evaluated with a virtual active set and a secondary virtual active set. Further, the computer-readable program instructions of one embodiment may include program instructions configured to cause first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set. The first and second reports may be provided either in parallel or serially.

In another embodiment, an apparatus is provided that comprises means for separately evaluating a measurement event utilizing: (i) a virtual active set including one or more cells from a neighbor cell list and (ii) a secondary virtual active set including one or more detected cells that are not included on the neighbor cell list. The apparatus of this example embodiment may also include means for causing a report to be provided in an instance in which the measurement event is satisfied with the report including an indication to be provided in an instance in which the measurement event is satisfied by the secondary virtual active set. In one embodiment, the report may also include an indication of the one or more detected cells in the secondary virtual active set that caused the measurement event to be satisfied to be provided.

Prior to the separate evaluation, the apparatus of one embodiment may also include means for maintaining both the virtual active set and the secondary virtual active set. The apparatus may also include means for receiving an indication that the measurement event is to be separately evaluated with a virtual active set and a secondary virtual active set. Further, the apparatus of one embodiment may also include means for causing first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set. The first and second reports may be provided either in parallel or serially.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
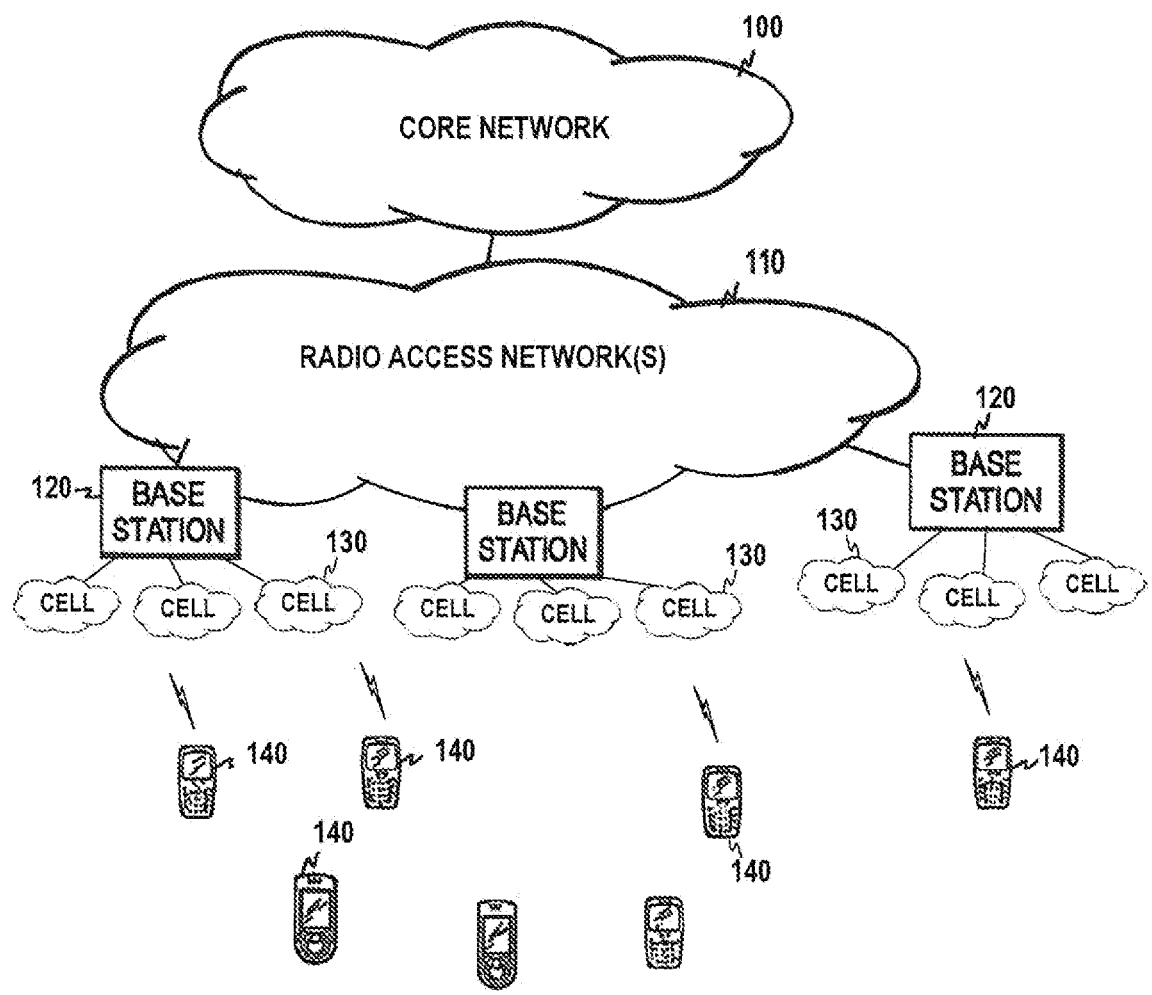
FIG. 1 illustrates a heterogeneous communication system according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

As defined herein, a "computer-readable storage medium", which refers to a non-transitory, physical storage medium (e.g., a volatile or non-volatile memory device), can be differentiated from a "computer-readable transmission medium", which may refer to an electromagnetic signal.

In conjunction with handover or cell reselection on an intra-frequency basis, reporting from the UE to the network of certain measurement events that may cause a handover or cell reselection process to be commenced that is based not only cells in the active set and monitored cells, but also detected cells is generally workable since the network has control over the active set. In this regard, the UE adds radio links to cells in the active set only when explicitly requested to do so by the network. Thus, the network does not have to add all of the detected cells that have been reported to the active set and can avoid, for example, adding detected cells that have been reported if the cells are known to be in a different PLMN, to be barred or to be reserved for operator use by another operator, such as in a country border case. Furthermore, the intra-frequency measurement events are designed to be triggered on a per-cell basis, and it is configurable whether or not the triggering condition for these events are affected by detected cells.

However, for the inter-frequency case, measurement events are on a per-frequency basis, as opposed to a per cell basis. In order to evaluate the quality of the frequency used to trigger the reporting of a measurement event, a UE may autonomously maintain a "virtual active set" that includes cells from the neighbor cell list that was signaled from the network, but not detected cells. As such, prior inter-frequency measurements only used active set cells, that is, cells in the virtual active set, and monitored set cells, that is, cells in the neighbor list, but not in the active set, to determine frequency quality estimates. The network may explicitly add and remove cells from affecting the frequency quality estimate by modifying the content of the neighbor list, as expressed in UTRAN as a "CELL_INFO_LIST". By preventing cells that are not in the neighbor cell list, such as cells not in the CELL_INFO_LIST, from affecting the measurement evaluation, networks have limited handover and cell reselection procedures to cells that are appropriate and have not considered cells that belong to a different PLMN, are barred or are reserved for operator use by another operator, such as in a country border case, thereby avoiding cells from another network affecting the event trigger which is used to evaluate whether to perform a handover or cell reselection. However, by excluding detected cells from consideration, such approaches may fail to take advantage of opportunities provided by detected cells that could offer improved performance and that belong to the same or an equivalent PLMN and are not barred or otherwise reserved for operator use by another operator.

FIG. 1 depicts a heterogeneous communications system according to various example embodiments of the present invention. Generally, the system includes one or more public land mobile networks (PLMNs) coupled to one or more other data or communication networks—notably a wide area network (WAN) such as the Internet. As shown, each of the PLMNs includes a core network 100 backbone such as the Evolved Packet Core (EPC); and each of the core networks and the Internet are coupled to one or more radio access networks 110, air interfaces or the like that implement one or more radio access technologies. As shown, the radio access networks each include one or more base stations 120 (or node B elements), access points or the like, each of which may serve a coverage area divided into one or more cells 130.

In addition, the system includes one or more mobile radio units that may be varyingly known as user equipment (UE) 140, terminal equipment, mobile station, mobile terminal or the like. As a mobile terminal, the UE may be a mobile computer, mobile telephone, a personal digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. In operation, these UEs may be configured to connect to one or more of the radio access networks 110 according to their particular radio access technologies to thereby access a particular core network of a PLMN, or to access one or more of the other data or communication networks (e.g., the Internet). In various instances, a single UE, a dual-mode or multimode UE, may support multiple (two or more) radio access networks—thereby being configured to connect to multiple radio access networks. For example, a particular UE may support both Global System for Mobile communications (GSM) and Universal Mobile Telecommunications System (UMTS) radio access technologies.

Examples of radio access technologies include $3^{rd}$ Generation Partnership Project (3GPP) radio access, Universal Mobile Telephone System (UMTS) radio access UTRAN (Universal Terrestrial Radio Access Network), GSM radio access, Code Division Multiple Access (CDMA) 2000 radio access, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP radio access technologies may include, for example, $3^{rd}$ generation (3G) or 3.9G (also referred to as UTRAN Long Term Evolution (LTE) or Super 3G) or E-UTRAN (Evolved UTRAN). Generally, a radio access technology may refer to any $2^{nd}$ generation (2G), 3G, $4^{th}$ generation (4G) or higher generation mobile communication technology and their different versions, as well as to any other wireless radio access technology that may be arranged to interwork with such a mobile communication technology.

Figure 2:
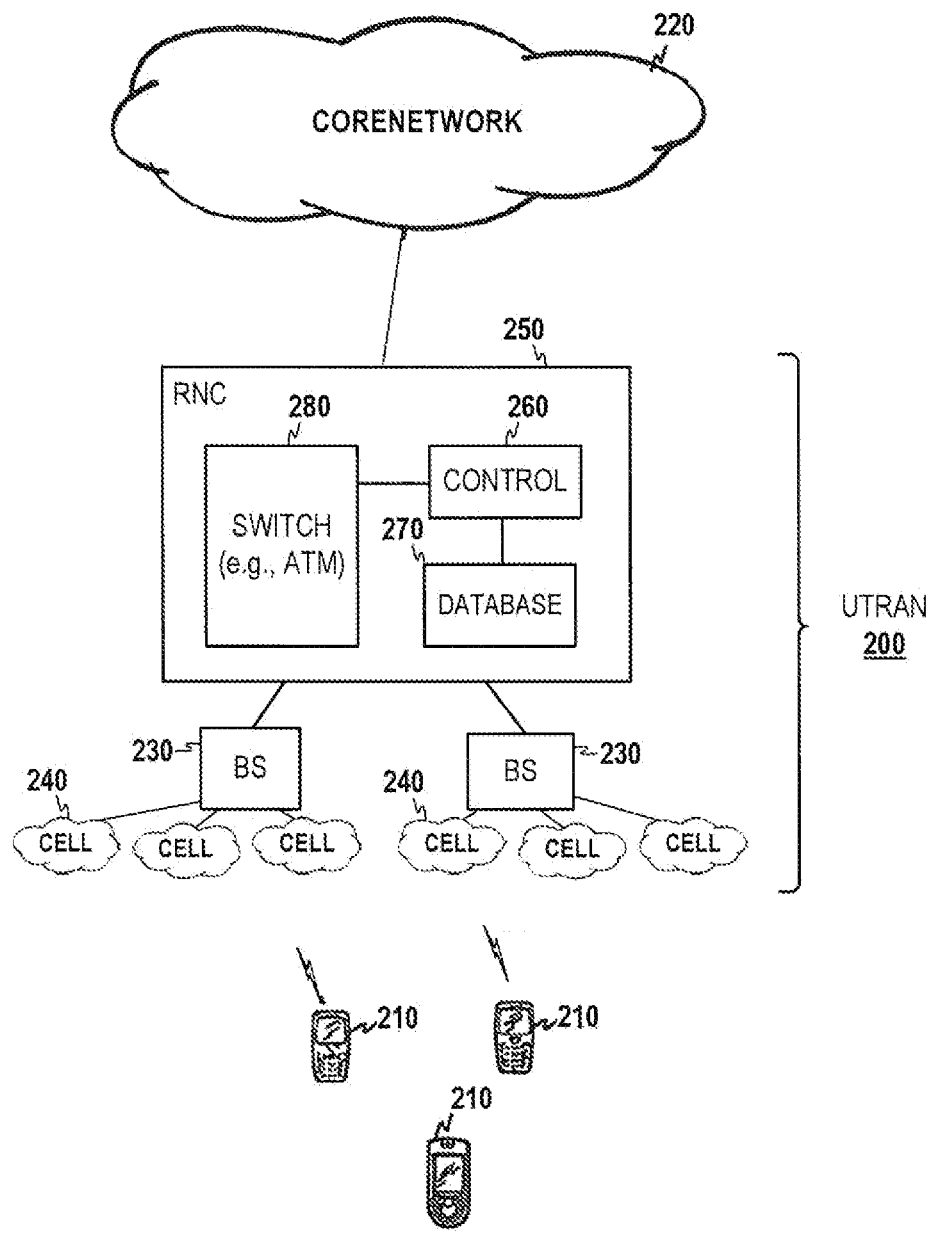
FIG. 2 illustrates a public land mobile network according to an example embodiment of the present invention.

Referring now to FIG. 2, a PLMN including a UTRAN is more particularly illustrated according to various example embodiments of the present invention. In this regard, example embodiments of the present invention may be particularly described with respect to UTRAN. More information on aspects of UTRAN may be found, for example, in 3GPP TS 25.331 v.10.0.0 (2010-06), entitled: *Radio Resource Control (RRC): Protocol Specification(Release* 10), the content of which is incorporated by reference in its entirety. It should be understood, however, that example embodiments may be equally applicable to other radio access technologies.

The UTRAN 200, which is one of the 3rd Generation Wireless Mobile Communication Technologies, can carry many traffic types from real-time circuit switched (CS) to Internet Protocol (IP)-based packet switched (PS) traffic. The UTRAN allows connectivity between the UE 210 and the core network 220. UMTS may use wideband code division multiple access (WCDMA). The UTRAN contains the base stations (BSs) 230, called Node Bs, each of which serves a coverage area divided into cell(s) 240. As shown, UE 210, core network 220, BS 230 and cell 240 are examples of respective ones of UE 140, core network 100, base station 120 and cell 130 of FIG. 1.

The UTRAN 200 may also include radio network controllers (RNCs) 250, each of which may provide control functionalities for one or more Node Bs. A Node B 230 and an RNC can be the same device, although typical implementations have a separate RNC located in a central office serving multiple Node Bs. Despite the fact that they do not have to be physically separated, there is a logical interface between them. The RNC and its corresponding Node Bs are called the radio network subsystem (RNS). There can be more than one RNS present in an UTRAN.

As also shown, a radio access network 110 may more generally include some type of network controlling/governing entity, such as the RNC 250 in UTRAN 200, which may be responsible for control of the BSs 230 (e.g., Node Bs) that are connected to the controller. As used herein, the term "network controller" or "network controlling/governing entity" may refer to any network element or a set of network elements configured to use inter-radio access technology measurements for a network decision. Such a network controlling/governing entity may also include a BS or a Node-B. The network controlling/governing entity may include a controller 260, processor or the like programmed to carry out radio resource management and mobility management functions, etc. The controller may be associated with a memory or database 270 for maintaining information required in the management functions. The network controlling/governing entity may include a switch unit 280 (such an Asynchronous Transfer Mode (ATM) switch) for switching connection between network elements within the radio access network. The network controlling/governing entity may be connected to a Circuit Switched Core Network through e.g., Media Gateway (MGW) and to e.g., a Serving General Packet Radio Service (GPRS) Support Node (SGSN) in a Packet Switched Core Network.

Figure 3:
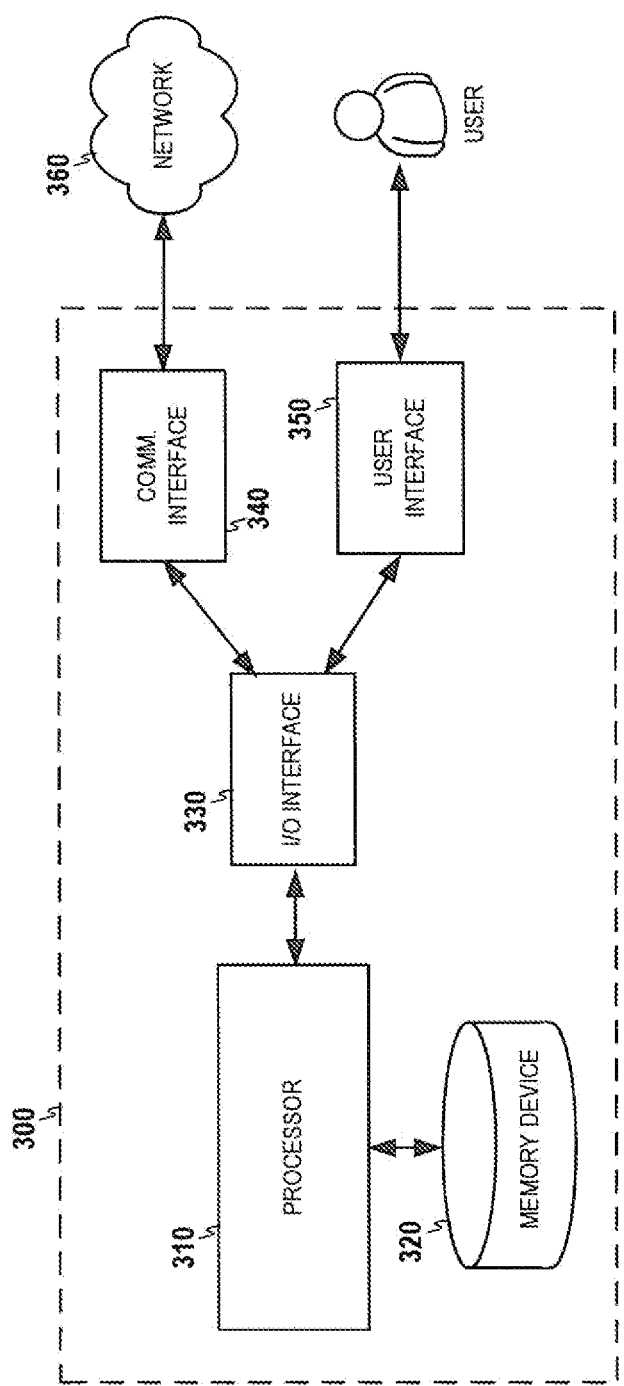
FIG. 3 illustrates an apparatus that may be configured to operate within the system of FIG. 1, according to an example embodiment of the present invention.

Reference is now made to FIG. 3, which illustrates an apparatus 300 according to example embodiments of the present invention configured to perform the various functionalities described herein. As shown and described herein, the example apparatus may be configured to function as or otherwise implement one or more of the network components depicted in FIG. 1 or 2 (e.g., BS 120, 230; UE 140, 210). The example apparatus depicted in FIG. 3 may also be configured to perform example methods of the present invention.

In some example embodiments, the apparatus 300 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 310, memory devices 320, Input/Output (I/O) interfaces 330, communications interfaces 340 and/or user interfaces 350 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 310 may be an entity capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 320 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 310.

Further, the memory device 320 may be configured to store information, data, applications, computer-readable program code instructions, and/or the like for enabling the processor 310 and the example apparatus 300 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 330 may be any device, circuitry, or means embodied in hardware, software or a combination of hardware and software that is configured to interface the processor 310 with other circuitry or devices, such as the communications interface 340 and/or the user interface 350. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 300 to perform, various functionalities of an example embodiment of the present invention.

The communication interface 340 may be any device or means embodied in hardware, software or a combination of hardware and software that is configured to receive and/or transmit data from/to one or more networks 360 (e.g., radio access networks 110, core networks 120, 220, etc.) and/or any other device or module (e.g., other similar apparatuses) in communication with the example apparatus 300. The processor 310 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 340 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), infrared data association (IrDA) or any of a number of different wireless networking techniques. The communications interface may also be configured to support communications at the network layer, possibly via Internet Protocol (IP).

The user interface 350 may be in communication with the processor 310 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 320). In some example embodiments, the user interface circuitry is configured to facilitate user control of at least some functions of the apparatus 300 through the use of a display and configured to respond to user inputs. The processor may also comprise, or be in communication with, display circuitry configured to display at least a portion of a user interface, the display and the display circuitry configured to facilitate user control of at least some functions of apparatus.

Referring again to FIG. 2, the UE 210 may operate in one of two modes, namely an idle mode and a RRC connected mode. In the idle mode, the UE may select a PLMN and search for a suitable cell 240 of the respective PLMN to provide available services to the UE. The UE may select the suitable cell and tune to its control channel by a process referred to as "camping on" a cell, which cell may be referred to as a serving cell. Upon camping on a serving cell, the UE may register its presence in the UTRAN registration area (URA) of the serving cell. In the idle mode, the UE may perform a periodic search for higher-priority PLMNs, and upon locating such a PLMN, may select to the new PLMN and camp on a selected cell of the new PLMN—repeating the process of selecting a suitable cell in the new PLMN.

Also upon camping on a serving cell, the UE 210 is permitted to receive system information and cell broadcast (CB) messages, and monitor the paging channel (PCH) and/or paging indicator channel (PICH) of the serving cell. The system information the UE may receive from the serving cell may include a list of cells adjacent to the serving cell. This list may be controlled by the network, and is oftentimes referred to as a neighbor cell list or more simply a neighbor list. The neighbor cell list permits the UE to search for a more suitable cell in the selected PLMN based on cell reselection criteria. In this regard, at various instances, the UE may locate a cell more suitable than the serving cell. In these instances, the UE may reselect and camp on the more suitable cell. And if the new serving cell is in a different URA, the UE may update its URA registration to the URA of the new serving cell.

The UE 210 may remain in the idle mode until it transmits a request to establish a network-layer connection (e.g., RRC connection) with the UTRAN 200, such as via the random access channel (RACH) of its serving cell. This request may be initiated by the UE or may be initiated by the network according to a paging procedure. In such instances, the UE may establish a RRC connection with one or more cells 240 of a RNC 250. The respective cell(s) and RNC may be referred to respectively as serving cell(s) and serving RNC. By establishment of a RRC connection the UE may enter the RRC connected mode, and by release of the RRC connection the UE may return to the idle mode. A UE in the idle mode may therefore be characterized by a UE not connected (e.g., RRC or network-layer connection) to a UTRAN, and a UE in the connected mode may be characterized by a UE connected to a UTRAN.

In the connected mode, the UE 210 may operate in one of a number of states, namely a CELL_DCH state, CELL_FACH state, CELL_PCH state and URA_PCH state. In the CELL_DCH (dedicated channel) state, the UE has a dedicated physical channel (DPCH) with its serving cell(s) 240 of the UTRAN 200. In the CELL_DCH state, the UE may be tracked at the cell level according to a cell update procedure (CELL UPDATE) in which the UE notifies the UTRAN of its serving cell, which may occur periodically or in response to handover of the UE to a new serving cell.

A UE 210 in the CELL_FACH, CELL_PCH and URA_PCH states may perform a cell reselection process similar to that performed by the UE in the idle mode. In this regard, a UE in one of these connected states may receive a neighbor cell list from its serving cell 240 and use the list to search for a more suitable cell based on cell reselection criteria. In instances in which the UE locates a more suitable cell, the UE may reselect and be connected to the more suitable cell; and if the new serving cell is in a different URA, the UE may update its URA registration to the URA of the new serving cell.

Similar to the UE 210 in the idle mode receiving a neighbor cell list from its serving cell, the UE in the connected mode may similarly receive a neighbor cell list from cell 240 to which the UE is connected. This list may also be controlled by the network. The list may be utilized to perform handover procedures, such as when the UE is in the CELL_DCH state. The list may also be used to perform cell reselection, such as when the UE is in the CELL_FACH state, CELL_PCH state or URA_PCH state.

Referring again to FIG. 2, a UE 210 may receive simultaneously communication service from a number of BSs 230 on a used frequency, with each BS assigning the UE one or more downlink dedicated physical channels (DPCH) in a respective one or more cells 240. These cell(s) to which the UE may be simultaneously connected may be defined as an active set. In the system, the UE may be handed over or undergo a cell reselection process between cells according to the neighbor cell list and, according to UTRAN, more particularly stored in a CELL_INFO_LIST.

The neighbor cell list may populate the active set and may also include a set of cells, referred to as a monitored set, which the UTRAN 200 may direct the UE 210 to monitor or otherwise measure (the monitored set including cells in the neighbor cell list not in the active set). The monitored set may include a subset of cells operating at the used frequency of the active set (intra-frequency), and one or more subsets of cells operating at one or more frequencies other than the used frequency (inter-frequency). In a manner similar to that by which the UTRAN maintains the active set, the UE may autonomously maintain a virtual active set for each of the other frequencies, where each virtual active set includes one or more of the monitored set cells operating at the respective frequency. A virtual active set may be treated as an active set for a respective non-used frequency.

In addition to the foregoing cells of the neighbor cell list, the UE 210 may be configured to detect and measure a number of cells that are in neither the active set nor the monitored set. This set of cells may be referred to as a detected set.

In the system, a UE 210 may be handed over or undergo a cell reselection process between cells using the same frequency (intra-frequency handover), or between cells using different frequencies (inter-frequency handover). The UTRAN 200 may direct a UE 210 to perform intra-frequency measurements of cells of the neighbor cell list (active set, monitored set) and detected set. These intra-frequency measurements may be reported to the UTRAN to permit evaluation of the quality of the respective cells and, if appropriate, trigger an intra-frequency handover or cell reselection event. Similarly, the UTRAN may direct the UE to perform inter-frequency measurements of each frequency of the virtual active set(s). These inter-frequency measurements, which for each virtual active set may cover multiple cells, may be reported to the UTRAN to permit evaluation of the quality of the respective frequencies and, if appropriate, trigger an inter-frequency handover or cell reselection event.

As currently defined by 3GPP, a UE 210 may take or otherwise perform inter-frequency measurements of virtual active cells and monitored set cells to permit evaluation of non-used frequencies and maintain the virtual active set. The cells of these sets are included in the neighbor cell list; and as the UTRAN 200 adds or removes cells from the neighbor cell list, the UTRAN may add or remove cells from affecting the inter-frequency measurements. This may permit the network to account for scenarios such as country border areas—whereby the network operator may not want cells from another network to affect the evaluation of whether to perform an inter-frequency handover or cell reselection (event trigger evaluation). As the detected set cells are not included in the neighbor cell list, however, the UTRAN may not have the same level of control over those cells that may affect inter-frequency measurements. Thus, as currently defined by 3GPP, the detected set cells are not included in inter-frequency measurements.

As explained below, an example embodiment of the present invention therefore provides inter-frequency measurement events whereby a UE 210 may be triggered to report measurements of one or more detected set cells to the network. The network may then determine whether reliance upon measurements of the detected set cells is appropriate and, if so, may take action, such as by initiating a handover or cell reselection process based upon the measurements of the detected set cells. For example, the network may determine if the detected set cells that provided the measurements are part of the same or an equivalent PLMN and are not barred or otherwise reserved for use by another operator and, if so, may initiate a handover or cell reselection process even though the measurements that have been reported are provided by detected set cells and not cells on the neighbor cell list.

Figure 4:
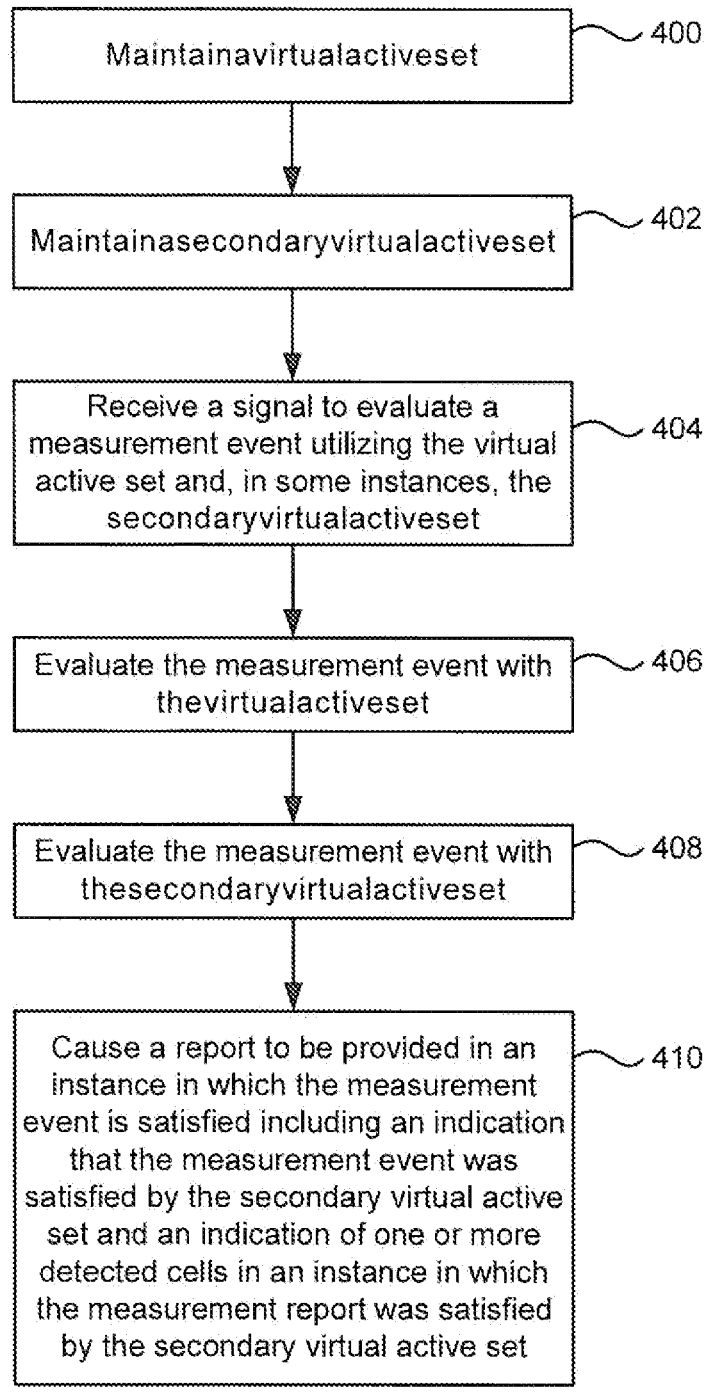
FIG. 4 is a flow chart illustrating operations performed in accordance with an example embodiment of the present invention.

Reference is made to FIG. 4, which presents a flowchart illustrating various operations that may be performed by an apparatus 300 according to an example embodiment of the present invention. The apparatus of this example embodiment may be embodied by or otherwise associated with a UE 140, 210. As shown in FIG. 3, the apparatus may include means, such as the processor 310, communication interface 340 (e.g., transmitter, antenna, etc.) or the like. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

In order to facilitate controlled reliance upon measurement events triggered not only by cells from a neighbor cell list, but also one or more detected cells that are not included in the neighbor cell list, an apparatus 300 may include means, such as the processor 310, memory device 320 or the like, for maintaining both a virtual active set and a secondary virtual active set, as shown in operations 400 and 402 of FIG. 4. In this regard, the virtual active set includes one or more cells from a neighbor cell list that has been previously provided by the network, such as in the form of a CELL_INFO_LIST in a UTRAN 200. In contrast to the virtual active set, the secondary virtual active set that is maintained by the apparatus includes one or more detected cells that are not on the neighbor cell list. While the secondary virtual active set may include some combination of cells on the neighbor cell list and one or more detected cells, the secondary virtual active set of one embodiment includes only detected cells. The list of cells that comprise the virtual active set and a list of detected cells that comprise the secondary virtual active set are generally stored by the processor and/or the memory device of the apparatus and may change over the course of time as new or different cells are added to the neighbor cell list in regard to the virtual active set and as more or different detected cells are detected by the UE 140, 210 in the context of the secondary virtual active set.

In accordance with one embodiment of the present invention as shown in operations 406 and 408 of FIG. 4, the apparatus 300 also may includes means, such as a processor 310 or the like, for separately evaluating a measurement event utilizing a virtual active set and utilizing the secondary virtual active set. Thus, each of one or more measurement events may be evaluated in a conventional manner utilizing the cells of the virtual active set, while the same measurement events may be evaluated utilizing the cells, such as the detected cells, of the secondary virtual active set. In other words, the method and apparatus of one example embodiment may be considered to evaluate two measurement events in parallel, each of which may involve the same evaluation, but with a different virtual active set. Thus, any subsequent reference to the evaluation of a measurement event with both the virtual active set and the secondary virtual active set also refers to the evaluation of two measurement events in parallel with each measurement event utilizing a different virtual active set even though the evaluation itself may be of the same type.

A variety of different measurement events may be evaluated utilizing the virtual active set and the secondary virtual active set. By way of example, the measurement events may be any one of events 2a, 2b, 2c, 2d, 2e and/or 2f that are defined in regard to inter-frequency reporting events in 3GPP TS 25.331. In this regard, event 2a is configured to be triggered in an instance in which the best frequency changes, event 2b is configured to be triggered in an instance in which the estimated quality of the currently used frequency is below a certain threshold and the estimated quality of a non-used frequency is above a certain threshold, event 2c is configured to be triggered in an instance in which the estimated quality of a non-used frequency is above a certain threshold, event 2d is configured to be triggered in an instance in which the estimated quality of the currently used frequency is below a certain threshold, event 2e is configured to be triggered in an instance in which the estimated quality of a non-used frequency is below a certain threshold and event 2f is configured to be triggered in an instance in which the estimated quality of the currently used frequency is above a certain threshold. In one embodiment, each of measurement events 2a, 2b, 2c, 2d, 2e and 2f is separately evaluated by the processor utilizing a virtual active set and utilizing the secondary virtual active set.

As shown in operation 410 of FIG. 4, in an instance in which a measurement event is satisfied or triggered, the apparatus 300 may include means, such as the processor 310, the communication interface 340 and the like, for causing a report to be provided to the network. In an instance in which the measurement event is satisfied or triggered by cells in the secondary virtual active set, the report may include an indication, such as a flag, indicating the satisfaction of the measurement event by one or more cells in the secondary virtual active set. In this scenario in which the measurement event was satisfied by one or more cells of the secondary virtual active set, the report may also include an indication, such as an identification, of the one or more detected cells in the secondary virtual active set that caused the measurement event to be satisfied.

Based upon the report including the indication that the measurement event was satisfied by one or more cells of the secondary virtual active set as well as the indication of the one or more detected cells of the secondary virtual active set that caused the measurement event to be satisfied, the network, such as the radio access network 110, RNC 250 or the like, may determine if reliance upon the one or more detected cells of the secondary virtual active set that caused the measurement event to be satisfied is appropriate. For example, the network may determine if the detected cell(s) are part of the same or an equivalent PLMN. Additionally, the network may determine whether or not the detected cell(s) of the secondary virtual active set are barred or otherwise restricted, such as for use by another operator. In an instance in which the network determines that the detected cell(s) of the secondary virtual active set that caused the measurement event to be satisfied is appropriate for consideration, such as by being part of the same or an equivalent PLMN, by not being barred, and by not being otherwise restricted, the network may communicate with the UE 140, 210 in order to initiate a handover or cell reselection process or to take other action based upon the satisfaction of the measurement event. Alternatively, if the network determines that reliance upon the detected cell(s) of the secondary virtual active set is inappropriate, such as in an instance in which the detected cell(s) is part of a different PLMN, is barred or is otherwise restricted, the network may not initiate a handover or cell reselection process and may not take any other action based on the satisfaction of the measurement event by the secondary virtual active set.

Thus, the method and apparatus 300 of one example embodiment of the present invention take advantage of the detected cells and identifies instances in which a measurement event is satisfied by a suitable detected cell. However, the method and apparatus provide information to the network regarding the detected cells that cause the measurement event to be satisfied so that the network may determine whether the detected cells may be relied upon in regards to taking action in response to the satisfaction of the measurement event, such as initiation of a handover or cell reselection process. Thus, the method and apparatus of one example embodiment permit reliance upon detected cells in a controlled fashion so that the advantages offered by reliance upon the detected cells are achieved without allowing detected cells that are inappropriate from adversely affecting operations.

The indication of the detected cells in the secondary virtual active set that cause the measurement event to be satisfied may be provided in various manners. In one embodiment, however, the apparatus 300 may include means, such as the processor 310, the communication interface 340 or the like, for providing an identification of the detected cell(s) as an information element of a message or signal transmitted from the apparatus to the network. For example, the identification of the detected cell(s) of the secondary virtual active set may be included in an information element identified as an additional measured results information element, an inter-frequency measured results information element, a non-frequency related measurement event results information element or any other information element. In one embodiment, the indication of the detected set cells of the secondary virtual active set that cause the measurement event to be satisfied may be provided by indicating the detected cells that were measured in the order of the quality of the detected cells, thereby providing an indication to the network as to the particular detected cell that may have satisfied the measurement event.

Figure 5:
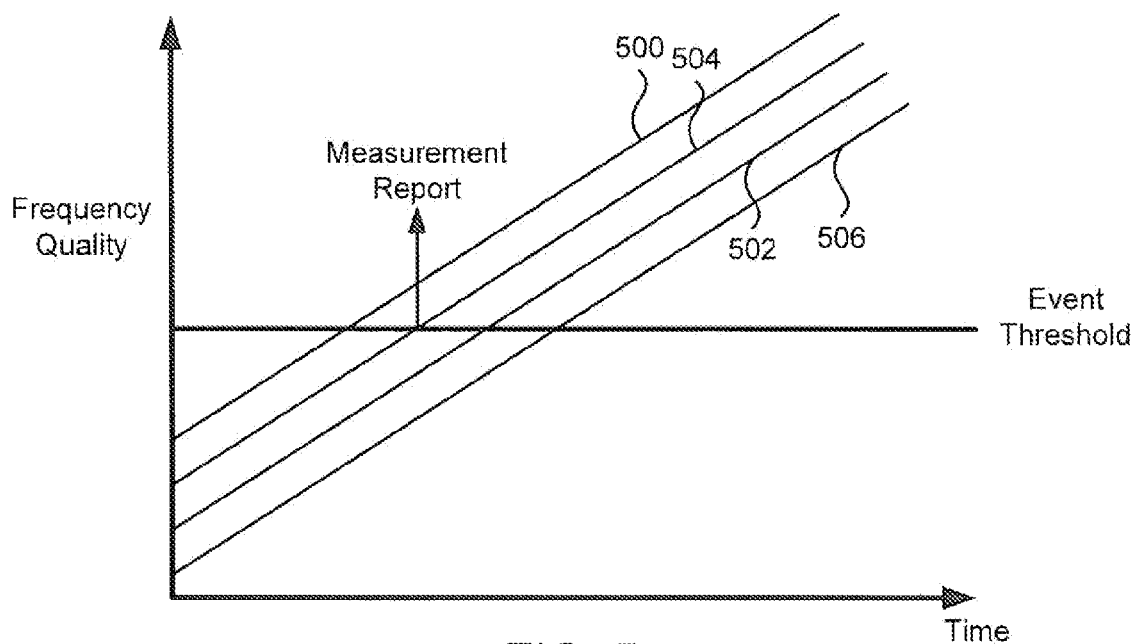
FIGS. 5 and 6 are graphs illustrating aspects of inter-frequency measurement events, according to example embodiments of the present invention.

By way of further explanation, several examples are provided. In one example, a measurement event may be satisfied by the virtual active set, but not by the secondary virtual active set as shown in FIG. 5. In this instance, the UE 140, 210 may provide a measurement report indicating that the measurement event was triggered by the virtual active set and may indicate the result of the measurement event utilizing the virtual active set. With reference to FIG. 5, for example, a graph is provided in which the vertical axis represents frequency quality and the horizontal axis represents time. As shown in FIG. 5, lines 500 and 502 represent frequency quality measurements of a pair of cells from the neighbor list in the virtual active set with line 504 representing the frequency quality estimate based upon the frequency quality measurements of the pair of cells from the virtual active set. As shown, the frequency quality estimate satisfies the event threshold and causes the issuance of a measurement report. As shown in FIG. 5, the frequency quality estimate attributable to the frequency quality measurements of the detected cells within a secondary virtual active set is also represented by line 506, but the frequency quality estimate associated with the detected cells of the secondary virtual active set does not satisfy the event threshold, at least not as of the time at which the event threshold was satisfied by the cells of the virtual active set. Thus, the measurement report provided to the network in accordance with this example will be dependent upon the frequency quality identified by the cells of the virtual active set and will not take into account the frequency quality as determined by the detected cells of the secondary virtual active set. Based upon the measurement report, the network may take appropriate action, such as by instituting a handover or cell reselection process.

In another example, a measurement event may be satisfied by both the virtual active set and the secondary virtual active set with the result of the satisfaction of the measurement event being the same, that is, the same frequency(ies) triggering the satisfaction measurement event. In one embodiment, the apparatus 300 in this example may cause a measurement report to be provided to the network that indicates that the event was triggered utilizing the virtual active set and may indicate the result of the measurement event utilizing the virtual active set. Based upon the measurement report, the network may take appropriate action, such as by instituting a handover or cell reselection process. In this embodiment, the apparatus may not provide any indication of the satisfaction of the measurement event by the secondary virtual active set.

Alternatively, in an instance in which the event is satisfied by the secondary virtual active set, but not the virtual active set, the apparatus 300 may cause a measurement report to be provided to the network that indicates that the event was triggered and may include an indication that the measurement event was satisfied by the secondary virtual active set, such as by means of a flag. Additionally, the apparatus may provide the result of the measurement event utilizing the secondary virtual active set and indicate the detected cells included in the secondary virtual active set that caused the measurement event to be satisfied, such as by including an identification of the detected cells in an information element of the message provided to the network. The network may then determine whether reliance upon the detected cells is appropriate and, if so, may take appropriate action, such as by instituting a handover or cell reselection process. Alternatively, if the network determines that reliance upon the detected cells is inappropriate, such as in an instance in which the detected cells are part of another PLMN, are barred or are otherwise restricted, the network may take no further action.

Figure 6:
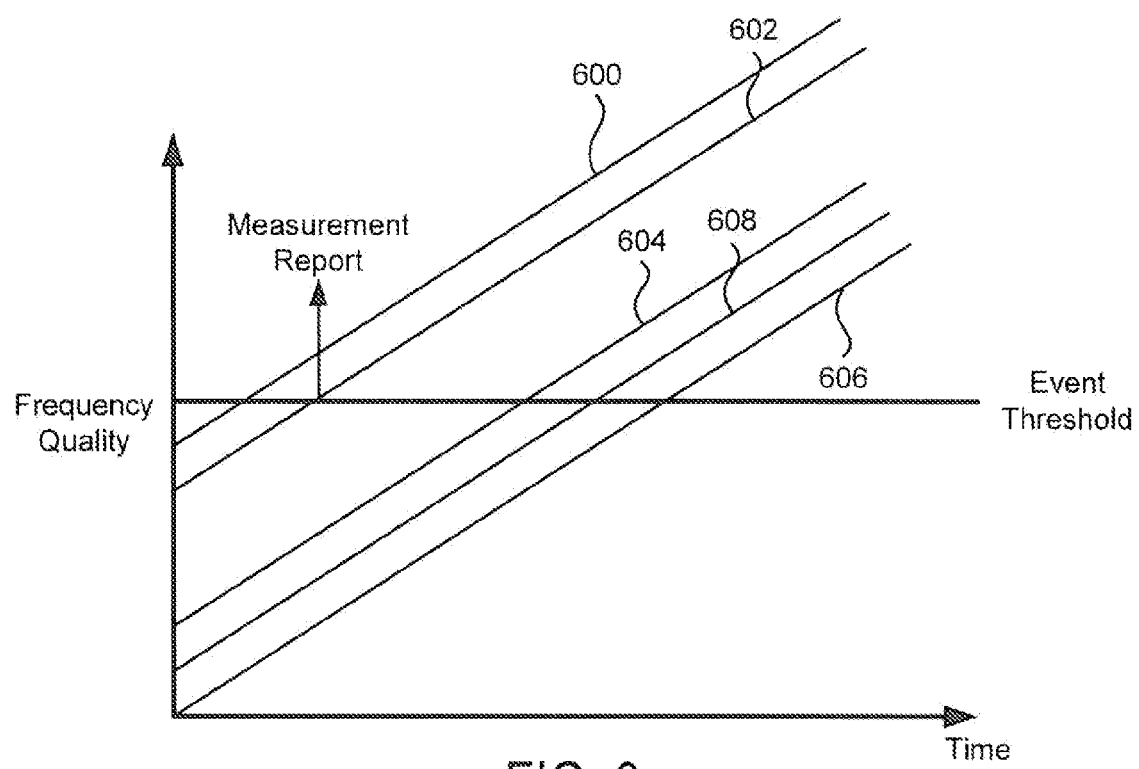

By way of illustration, FIG. 6 depicts an example in which the frequency quality measurements 600 of a detected cell of the secondary virtual active set and, in turn, the resulting frequency quality estimate 602 satisfy the event threshold prior to satisfaction of the event threshold by the frequency quality measurements 604, 606 and the resulting frequency quality estimate 608 of the cells of the virtual active set. Thus, the measurement report provided to the network in this instance is based upon the frequency quality estimate associated with one or more detected cells of the secondary virtual active set. As such, the measurement report may include a flag or other indication indicating the satisfaction of the measurement event by one or more detected cells of the secondary virtual active set and may also identify the detected cells for further consideration by the network.

In another example that may be applicable in regard to measurement event 2a involving a change in the best frequency, the measurement event may be satisfied utilizing both the virtual active set and the secondary virtual active set, but the results of the evaluation of the measurement event by the two different virtual active sets may differ. For example, the evaluation of the measurement event in accordance with the virtual active set may yield a different result, such as a different frequency being the best frequency, than the evaluation of the same measurement event by the secondary virtual active set. In this example, the apparatus 300 may provide the measurement report indicating that the measurement event was satisfied by both the virtual active set and the secondary virtual active set, may indicate the result of the measurement event utilizing the virtual active set and the result of the measurement event utilizing the secondary virtual active set, and may also indicate the detected cells included in the secondary virtual active set that were relied upon in the evaluation of the measurement event. The measurement report for both the virtual active set and the secondary virtual active set may be sent in parallel or coincident with one another as part of the same overall measurement report. Alternatively, the apparatus may send one measurement report indicating that the measurement event was satisfied by one of the virtual active set or the secondary virtual active set and may then send another measurement report indicating the satisfaction of the measurement event by the other one of the virtual active set or the secondary virtual active set such that the measurement reports are sent serially.

In regard to measurement events 2b, 2c, 2d and 2f, multiple frequencies can trigger the measurement event. Thus, the apparatus 300 may provide a report that includes a list of frequencies satisfying the measurement event. In the list, the apparatus may indicate, such as by means of a flag, those frequencies that satisfied the measurement event utilizing the secondary virtual active set without including any particular indication or flag associated with those frequencies that satisfied the measurement event based upon the virtual active set, but not the secondary virtual active set.

In one embodiment, the apparatus 300 may separately evaluate the measurement event based upon not only the virtual active set, but also the secondary virtual active set in an instance in which the network has authorized or provided direction to the apparatus to conduct such an evaluation with the secondary virtual active set. As such, the apparatus may also include means, such as the communication interface 340, the processor 310 or the like, for receiving an indication from the network that the measurement event is to be separately evaluated with both a virtual active set and the secondary virtual active set, as shown in operation 404 of FIG. 4. As shown, for example, in FIG. 7, a UE may initially receive a measurement control signal from the network that indicates one or more measurement events to be evaluated and also indicates whether the measurement events are to be evaluated by a secondary virtual active set in addition to the virtual active set. The UE may then evaluate the measurement event(s) that have been authorized by the network based upon the virtual active set and, in an instance in which the network has indicated that the secondary virtual active set is also to be considered, also by the secondary virtual active set. In an instance in which one or more of the measurement events is satisfied, the UE may issue a measurement report to the network that may indicate that the measurement event has been satisfied and may provide the appropriate information, such as the frequency(ies) at which the measurement event was satisfied. In accordance with an example embodiment of the present invention, the measurement report may also indicate an instance in which the measurement event was satisfied by the secondary virtual active set and, in this situation, may also identify the one or more detected cells of the secondary virtual active set. The network may then determine if reliance upon the detected cells of the secondary virtual set is appropriate and, only if so, may take the action that is otherwise associated with satisfaction of the measurement event, such as institution of a handover or cell reselection process.

The method and apparatus 300 of an example embodiment of the present invention therefore take advantage of the additional information provided by a detected cell. However, the method and apparatus of an example embodiment provide sufficient information to the network to permit the network to remain in control of the action taken in response to the satisfaction of the measurement event, such as by determining if reliance upon the detected cells of a secondary virtual active set is appropriate prior to taking action, such as prior to instituting a handover or cell reselection process.

Figure 7:
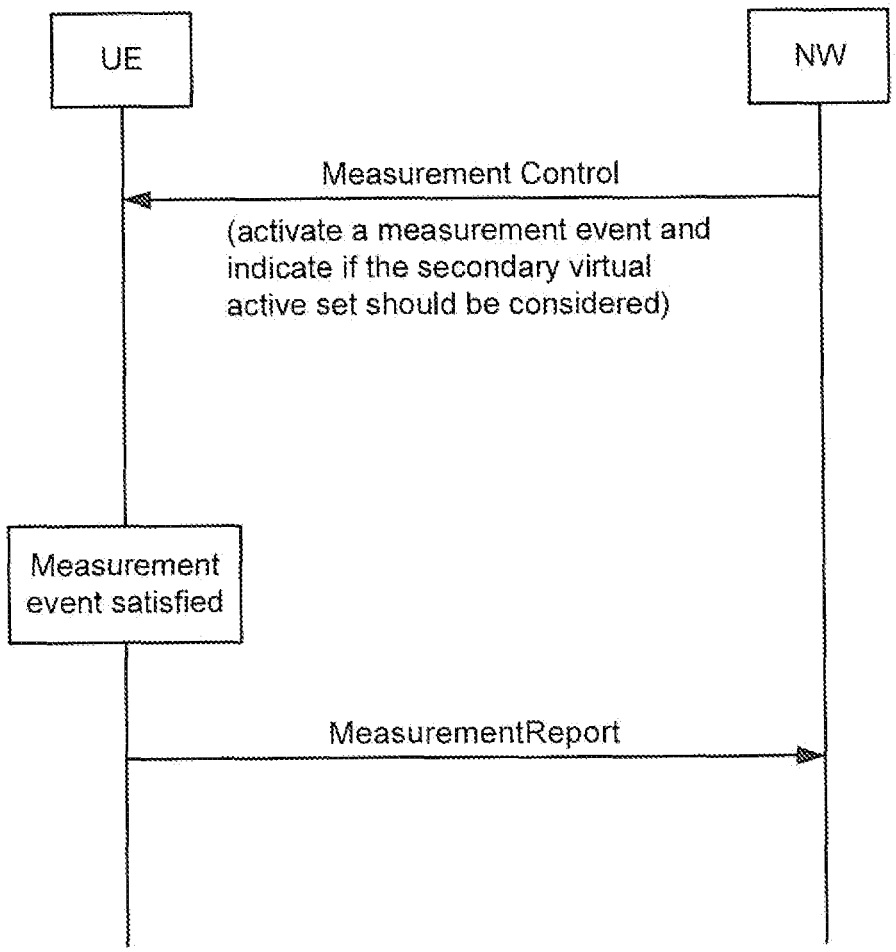
FIG. 7 is a control flow diagram illustrating a message sequence for operation of an inter-frequency measurement event, according to example embodiments of the present invention.

According to one aspect of the example embodiments of present invention, the functions performed by the apparatus 300, such as those illustrated by the control flow diagram and flowchart of FIGS. 4 and 7, may be performed by various means. It will be understood that each block or operation of the control flow diagram and flowchart, and/or combinations of blocks or operations in the control flow diagram and flowchart, can be implemented by various means. Means for implementing the blocks or operations of the control flow diagram and flowchart, combinations of the blocks or operations in the control flow diagram and flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 320 of the example apparatus, and executed by a processor, such as the processor 310 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the control flow diagram and flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the control flow diagram and flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the control flow diagram and flowchart's block(s) or operation(s).

Accordingly, execution of instructions associated with the blocks or operations of the control flow diagram and flowchart by a processor, or storage of instructions associated with the blocks or operations of the control flow diagram and flowchart in a computer-readable storage medium, supports combinations of operations for performing the specified functions. It will also be understood that one or more blocks or operations of the control flow diagram and flowchart, and combinations of blocks or operations in the control flow diagram and flowchart, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although described above in conjunction with UTRAN, the method, apparatus and computer program product of other example embodiments may be employed in conjunction with other types of networks. Additionally, the method, apparatus and computer program product of an example embodiment of the present invention may be utilized in conjunction with various types of reselections including intra-frequency, inter-frequency and inter-radio access technology (inter-RAT) reselections. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A method comprising:
separately evaluating measurement events utilizing: (i) a virtual active set including one or more cells from a neighbor cell list and (ii) a secondary virtual active set including one or more detected cells that are not included on the neighbor cell list, wherein at least two measurement events utilize different virtual active sets;
causing a report to be provided in an instance in which a measurement event is satisfied, wherein causing the report to be provided comprises causing an indication to be provided in an instance in which the measurement event is satisfied by the secondary virtual active set and causing an indication of the one or more detected cells in the secondary virtual active set that caused the measurement event to be satisfied to be provided; and
in response to the causing of the report to be provided determining whether the one or more detected cells corresponding to the secondary virtual active set are restricted.

2. A method according to claim 1 wherein causing the indication to be provided comprises causing an identification of the one or more detected cells in the secondary virtual active set that caused the measurement event to be satisfied to also be provided.

3. A method according to claim 1 further comprising maintaining both the virtual active set and the secondary virtual active set.

4. A method according to claim 1 further comprising receiving an indication that the measurement event is to be separately evaluated with a virtual active set and a secondary virtual active set.

5. A method according to claim 1 wherein causing the report to be provided comprises causing first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set.

6. A method according to claim 5 wherein causing the first and second reports to be provided comprises causing the first and second reports to be provided one of in parallel or serially.

7. An apparatus comprising at least one processor and at least one memory storing computer program code, wherein the at least one memory and stored computer program code are configured, with the at least one processor, to cause the apparatus to at least:
separately evaluate measurement events utilizing: (i) a virtual active set including one or more cells from a neighbor cell list and (ii) a secondary virtual active set including one or more detected cells that are not included on the neighbor cell list, wherein at least two measurement events utilize different virtual active sets;
cause a report to be provided in an instance in which a measurement event is satisfied, wherein causing the report to be provided comprises causing an indication to be provided in an instance in which the measurement event is satisfied by the secondary virtual active set and causing an indication of the one or more detected cells in the secondary virtual active set that caused the measurement event to be satisfied to be provided; and
in response to the causing of the report to be provided determining whether the one or more detected cells corresponding to the secondary virtual active set are restricted.

8. An apparatus according to claim 7 wherein the at least one memory and stored computer program code are configured, with the at least one processor, to cause the apparatus to cause the indication to be provided by causing an identification of the one or more detected cells in the secondary virtual active set that caused the measurement event to be satisfied to also be provided.

9. An apparatus according to claim 7 wherein the at least one memory and stored computer program code are further configured, with the at least one processor, to cause the apparatus to maintain both the virtual active set and the secondary virtual active set.

10. An apparatus according to claim 7 wherein the at least one memory and stored computer program code are further configured, with the at least one processor, to cause the apparatus to receive an indication that the measurement event is to be separately evaluated with a virtual active set and a secondary virtual active set.

11. An apparatus according to claim 7 wherein the at least one memory and stored computer program code are configured, with the at least one processor, to cause the apparatus to cause the report to be provided by causing first and second reports to be provided in an instance in which the measurement event is satisfied by both the virtual active set and the secondary virtual active set with the first report being based on satisfaction of the measurement event by the virtual active set and the second report being based on satisfaction of the measurement event by the secondary virtual active set.

12. An apparatus according to claim 11 wherein the at least one memory and stored computer program code are configured, with the at least one processor, to cause the apparatus to cause the first and second reports to be provided by causing the first and second reports to be provided one of in parallel or serially.

13. An apparatus according to claim 7, wherein the apparatus comprises or is embodied in a mobile terminal.

14. An apparatus according to claim 13, wherein the mobile terminal comprises user interface circuitry and user interface software stored on one or more of the at least one memory; wherein the user interface circuitry and user interface software are configured to:
facilitate user control of at least some functions of the mobile terminal through use of a display; and
cause at least a portion of a user interface of the mobile terminal to be displayed on the display to facilitate user control of at least some functions of the mobile terminal.

15. A computer program product comprising at least one non-transitory computer-readable storage medium having computer-readable program instructions stored therein, the computer-readable program instructions comprising:
program instructions configured to separately evaluate measurement events utilizing: (i) a virtual active set including one or more cells from a neighbor cell list and (ii) a secondary virtual active set including one or more detected cells that are not included on the neighbor cell list, wherein at least two measurement events utilize different virtual active sets;
program instructions configured to cause a report to be provided in an instance in which a measurement event is satisfied, wherein causing the report to be provided comprises causing an indication to be provided in an instance in which the measurement event is satisfied by the secondary virtual active set and causing an indication of the one or more detected cells in the secondary virtual active set that caused the measurement event to be satisfied to be provided; and in response to the causing of the report to be provided determining whether the one or more detected cells corresponding to the secondary virtual active set are restricted.

* * * * *